BINARY ACCUMULATOR CIRCUIT

Filed March 16, 1954

INVENTOR
GEORGE A. HARDENBERGH
BY
George Lipkin
B. L. Zangwill
ATTORNEYS

United States Patent Office 2,780,409

Patented Feb. 5, 1957

2,780,409

BINARY ACCUMULATOR CIRCUIT

George A. Hardenbergh, St. Paul, Minn., assignor, by mesne assignments, to the United States of America as represented by the Secretary of the Navy Application March 16, 1954, Serial No. 416,723

5 Claims. (Cl. 235—61)

The present invention relates to an electrical digital computer or register device and more particularly to an electrical binary accumulator circuit of the parallel type for use with a digital computer or a registering device.

In the field of digital computers and registering devices, electronic circuits are employed to perform the basic mathematical functions of addition, subtraction, division, multiplication and other mathematical operations. The basic function of addition is usually performed by means of a binary accumulator or adder circuit wherein numerical values represented in the binary code by the presence or absence of a pulse in a pulse train of a basic repetition rate, are transmitted to the binary accumulator circuit and combined with a first value previously registered therein to produce the numerical sum thereof. That is, a value, normally referred to as an augend, is stored in the binary accumulator by a previous operation and then, upon receipt of a second value or addend, an electrical operation is initiated wherein the binary sum of the two values is indicated.

Binary accumulator circuits are basically of two general types; first, a series type wherein a common transmission channel or bus provides in sequence, information relative to the various binary digits from a static register of the computer or registering device to a series of elementary accumulator stages wherein the individual digits of the addend are distinguished by the time of arrival of the pulses characterizing each digit in the pulse train to the accumulator circuit; and second, a parallel type consisting of a series of elementary accumulator stages each of which has an individual transmission channel input and over which the individual digits of the addend are simultaneously transmitted to the accumulator circuit. The present invention relates to a binary accumulator of the parallel type.

Each elementary accumulator stage of the prior art adapted for use in a parallel process usually consists of a primary electronic storage device such as a trigger circuit which may typically be a circuit of the Eccles-Jordan type. Such a circuit includes a pair of electron vacuum tubes and associated electrical components to provide two stable states or conditions wherein one stable state is produced with a first tube of the pair conductive and the second tube of the pair non-conductive and the second stable state is produced by a reversed conductivity condition of the two tubes. The reversal of the order of conduction of the tubes from one stable state to the other is controlled by the application of an electrical pulse to the circuit.

Whenever a digit of the addend is applied to the trigger circuit, a carry, as will hereinafter be explained, will be produced in each instance where the trigger circuit is in a particular condition. The carry is then transferred to the next succeeding elementary accumulator stage. However, since the trigger circuit can respond to but one pulse at one time, the carry must be delayed by a time period equal to or greater than the time period necessary for the succeeding elementary accumulator stage to reach stability following its direct addend input operation. This delay has been accomplished by the use of a secondary storage device or trigger circuit which may be of the Eccles-Jordan type or of the well known "one-shot" multivibrator type which has only one stable state and is responsive to a carry pulse to turn over twice for each such pulse. The secondary storage device functions to store the carry and also to control an electronic switch or gate such that upon the initiation of the carry pulse, the secondary storage device will be activated to register the carry pulse and operate to bias the electronic switch in an operative position. Further, a carry line or bus is provided wherein a pulse is actuated in each cycle of operation in the addition process to further control and open the gate and thus release the carry pulse to the succeeding or higher digit stage.

This use of a secondary storage device with its additional electronic gates and carry line necessarily requires additional electronic vacuum tubes and circuits which greatly increase the initial cost of the equipment, require very careful and extensive maintenance, and further, consume electrical power from the usually overburdened power supply.

The present invention comprises an improved binary accumulator circuit of the parallel type wherein each of the individual elementary stages has a separate input transmission channel for each digit of the addend and in which a carry pulse generated by the unit for interval delivery from a lower order digit stage to the next higher order digit stage is delayed by means of an electrical delay line prior to the transmission of the carry pulse to the next elementary accumulator stage of a higher digit.

An object of the present invention is the provision of an improved binary accumulator circuit.

Another object is to provide a binary accumulator circuit which is simple, accurate and efficient in accomplishing its designed task.

A further object of the invention is to provide a binary accumulator circuit which is less expensive to construct, operate, and maintain and yet one which is durable in operation.

Other objects and features of the invention will become apparent to those skilled in the art as the disclosure is made in the following detailed description of a preferred embodiment of the invention as illustrated in the accompanying sheet of drawing in which:

Fig. 1 of the drawing discloses a block diagram of a specific electrical apparatus typifying the features of the present invention;

Figure 1:
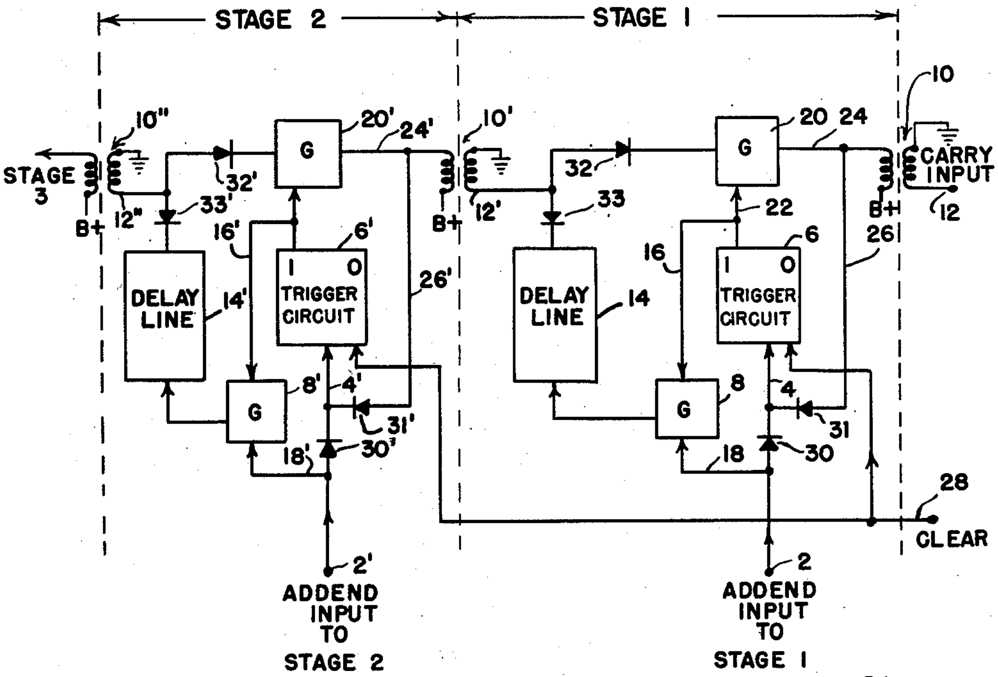

Referring now to the drawing, wherein like reference characters designate like or corresponding parts throughout the several views, there is shown two elementary accumulator stages of a binary accumulator or adder circuit of which there are at least as many elementary accumulator stages as there are columns or binary digits in the largest binary number employed. Thus, each elementary accumulator stage is capable of receiving and storing one digit of a binary number at any one time.

Included in each elementary accumulator stage is a transmission channel or addend input 2 wherein a binary digit of the addend, represented by either a pulse or the lack of a pulse, is received from a static register or other component of the digital computer or registering device. The addend input is connected by means of line 4 through a unilateral impedance element 30, for reasons hereinafter explained, to a trigger circuit 6 of the well known Eccles-Jordan type.

Figure 2:
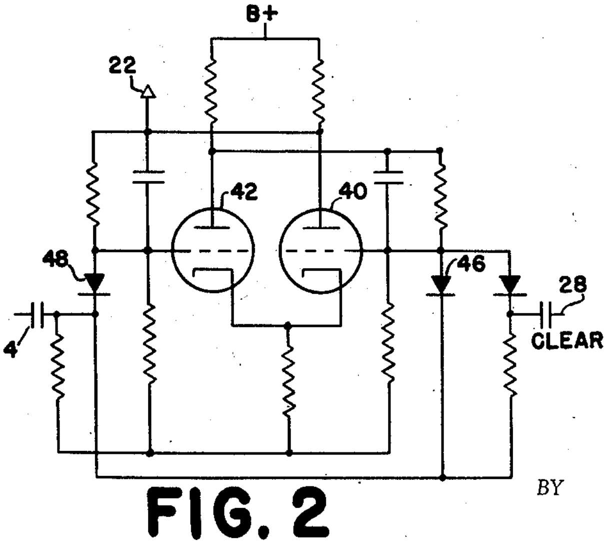
Fig. 2 shows a wiring diagram of a trigger circuit which may be employed.

A trigger circuit of this type, as clearly shown in Fig. 2, usually consists of a regenerative type amplifier including a pair of electronic vacuum tubes 40, 42 resistance-capacitance-coupled between the plate and grid of the respective tubes. An input 4 is applied directly to the grids of the tubes 40, 42 through unilateral impedance elements 44, 46 which latter elements function to provide a low impedance path to a pulse applied to the control grids of the tubes from the input 4 but present a high impedance path to a pulse traveling in the opposite direction. The unilateral elements thus operate to prevent a pulse from traveling from the plate of one tube to its respective grid by way of the input line. In operation, the trigger circuit is capable of assuming either one of two distinct and stable conditions. Thus, in the first stable condition, tube 40 of the pair of tubes is conducting while tube 42 is held non-conducting and in the second stable condition, the operation of the two tubes is reversed; the conditions being reversible at will by the application of an electrical pulse to the input 4 of the trigger circuit. Since the respective anodes of the two tubes are connected to a source of positive potential through high plate resistances, the voltages at the anode of the non-conducting tube is nearly equal to that of the source of positive potential while the voltage at the anode of the conducting tube is greatly reduced from the voltage of the source of positive potential because of the voltage drop in the associated plate resistance. Hence, upon application of a pulse to the trigger circuit 6 from input line 4, the particular resulting combination of high and low plate voltage of the trigger circuit may be taken as representing one value of the binary digit. Typically, this value may be selected as the "1" value of the binary digit whereas the other conducting condition combination of the trigger circuit will represent the "0" value of the binary digit.

In the binary system there are only two possible values of each digit, which are represented as a "0" and a "1." The typical addition of "0" and "0" gives "0" just as in the decimal system. Likewise, the additions "0"+"1" and "1"+"0" give the value of "1" for the added digit. The addition of "1"+"1" however, results in the representation of an "0" in the position of the digit itself plus a carry over of a "1" to the next higher digit. This increased signal is called a "carry" and is analogous to the decimal addition situation where the sum of two decimal digits is greater than 9 to produce the familiar "carry" to the next higher digit. Thus, to add by means of the binary accumulator circuit, it is necessary that upon an application of a pulse to the trigger circuit 6, the pulse will operate the trigger circuit to its stable indicative of "1" position; but, if the augend is such that a "1" condition has already been registered, the trigger circuit will overturn to the "0" condition, and simultaneously therewith, produce a "carry" pulse to be transmitted to the next succeeding stage or higher digit.

Figure 3:
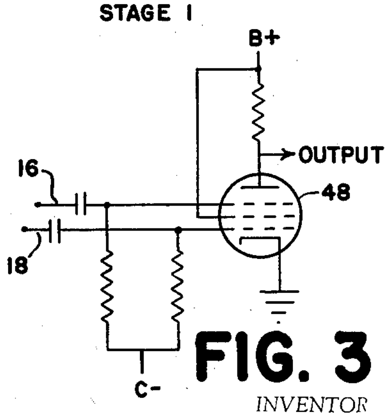
Fig. 3 is a circuit diagram of a typical electronic switch.

Included in each elementary stage is an electronic switch or gate of suitable type such as, for example the one illustrated in Fig. 3. An electronic switch of this type may include a vacuum tube 48 having a plurality of grids of which two grids operate as control grids biased below "cut-off" by a suitable C-potential. Each of the control grids is provided with an individualized input 16, 18 which operate to control the conduction of the tube. Thus the tube is normally prevented from conducting because of the biased condition of the control grids but upon the simultaneous application of a positive pulse signal to each of the grids, wherein the bias of the grids are raised above "cut-off," the tube begins to conduct and permits a signal to "pass" through the switch.

Referring now to Fig. 1, there is shown a first electronic switch 8 controlled by the trigger circuit 6 through line 16 and the addend input 2 through line 18 such that the trigger circuit 6 will bias open the electronic gate 18 whenever the trigger circuit is in a "1" condition or state, i. e. it has registered or stored therein a binary digit of 1. When a pulse is fed to the elementary accumulator stage by way of the addend input, it will take a divided path through lines 4 and 18, simultaneously overturning the trigger circuit to its next position or state and, if the trigger circuit 6 is in a "1" condition, pass through the gate 8 as a "carry" pulse to an electrical impedance delay line 14 of the artificial transmission line type. The delay line is constructed of various selected electrical impedances such that a delay is imparted to the "carry" pulse which is equal to or greater than the time period necessary for the succeeding elementary accumulator stage to reach stability in its initial direct addend-input operation, this delay being necessary since a storage device of the trigger circuit type can respond to but one pulse at any one time. The pulse after emerging from the delay line is then passed through a unilateral impedance element 33 to the next succeeding or higher digit stage through a pulse inverting transformer 10′, the use of which will hereinafter be explained.

A second electronic switch or gate 20 of a type similar to the electronic gate 8 is connected to a carry input 12 by way of line 24 and to the trigger circuit 6 through line 22, which gate serves to control the passage of the "carry" pulse through the elementary stage. The gate is controlled by the trigger circuit 6 in that the gate remains open whenever the trigger circuit is in its "1" condition. Thus, as a "carry" input is fed into the elementary stage, it takes a divided path through lines 24 and 26 to simultaneously overturn the trigger circuit into another state and depending on the condition registered upon the trigger circuit, passes through the gate 20 into the next higher digit stage through unilateral impedance element 32 and the pulse inverting transformer 10′. It is noted that the "carry" pulse, upon passing through the gate 20, is not delayed, but continues directly to the next stage; further delay being unnecessary since the original delay of the "carry" pulse in the proceeding elementary stage provides ample time for the succeeding stages to recover from their original operation.

As a carry pulse is passed through an electronic gate 8, 20 the pulse undergoes a polarity inversion due to the inherent characteristics of the electronic gate and since the trigger circuit is designed to respond to an electrical pulse of a certain polarity, a pulse inverting transformer 10 is placed between each of the elementary accumulator stages to subject each of the "carry" pulses to a polarity inversion of 180° prior to its entrance into the next stage whereby the "carry" pulse is thus reverted back to its original polarity for presentation to the trigger circuit of the succeeding stage.

Interposed within the lines 4, 26 and input lines 12, are a plurality of unilateral impedance elements 30, 31, 32 and 33, each of which serves to control the conduction of a pulse within a predetermined path, the elements being of the type which present a low impedance to the current flow in one direction but which offer a very high impedance path to an oppositely flowing current. Thus the unilateral impedance element 30 in line 4, for example, presents a low impedance path for an addend input pulse to the trigger circuit 6 while preventing the passage of a "carry" pulse traveling in line 26 from entering the gate 8 through line 18 by presenting a very high impedance path to the carry pulse. The unilateral elements in each of the other lines serve similar functions of control and are self-explanatory from the drawing.

Whenever it is desired that the storage devices of each elementary accummulator stage be returned to an initial operating condition, wherein all the stages are in the "0" state or condition, a "clear" line 28 connecting each of the trigger circuits 6 is pulsed, with the result that the binary accumulator circuit is prepared for another set of values.

To examine a typical adding operation, assume that elementary stage 1 and elementary stage 2 of the binary accumulator circuit already register a binary augend of "01" upon their respective trigger circuits in which instance the first digit "0" is sustained by elementary stage 1 and the second digit "1" is sustained by elementary stage 2. Also, that the addend is "11" in binary code. Upon the simultaneous input of the digits to each of the stages, the digit "1" fed into stage 2 will turn over the trigger circuit 6′ of that stage to a "1" condition which in turn opens each of the gates in the circuit; the trigger circuit 6 of stage 1 having a "1" state or condition already registered therein by the augend and thereby having each of its gates open, will upon a receipt of the digit "1" of the addend, overturn to its "0" state or condition and simultaneously pass a carry pulse through the gate 8 into the delay line 14. At this point, a partial or temporary digital sum of "10" is registered, with a "carry" pulse traveling along the delay line of stage 1. In a predetermined period of time, depending on the set time delay of the delay line 14, the pulse emerges, is inverted in the pulse inverting transformer 10′ between stages, and enters stage 2; the carry pulse then takes a divided path by way of lines 24′ and 26′ to the gate 20′ and trigger circuit 6′ to overturn the trigger circuit 6′ to the "0" state or condition and also since the trigger circuit 6′ was already in the "1" condition, and the gate 20 thereby open, the carry pulse is transmitted to the third similar stage to register a total of "100" on the binary accumulator circuit.

By the above described arrangement of gates and delay circuits, the trigger circuits are permitted to recover from the direct addend input operation before handling the carry overs of the system.

Thus it can be seen that applicant has provided by the arrangement and choice of components, an accurate and improved binary accumulator circuit which is simple and efficient in operation and yet, by the use of an electrical impedance type of delay line, has provided a binary accumulator circuit which is less expensive to construct, operate and maintain.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A binary accumulator circuit of the parallel type comprising the combination of a plurality of serially arranged elementary accumulator stages each of which includes a trigger circuit operable to a first and a second stable condition, a first and a second pulse input means for said trigger circuit, a first and a second switching means connected to said trigger circuit and with said first and second input means respectively, said first and second switching means being controlled to a closed and an opened position by said trigger circuit and said first and second input means respectively, a delay line having a predetermined time delay connected to said first switching means, and an output means interposed in the circuit of said second switching means and said delay line.

2. A binary accumulator circuit comprising a plurality of serially related elementary accumulator stages each of which includes a trigger circuit having two stable conditions, a first pulse input means for said trigger means, a first gating means in circuit relationship with and jointly controlled by said trigger means and said first input means, an impedance delay means having a predetermined time delay connected to said first gating means, a second pulse input means for said trigger circuit, a second gating means connected with and jointly controlled by said trigger circuit and said second input means, and an output means for said second gating means and said delay line.

3. A binary accumulator circuit of the parallel type comprising a plurality of serially arranged elementary accumulator stages each of which includes a trigger circuit operable to either of two stable conditions by the application of a pulse thereto, a first and a second pulse input means for said trigger circuit, a first and a second electronic switching means each of which is provided with an open and a closed position connected to said trigger circuit and with said first and second pulse input means respectively wherein said trigger means and said respective pulse input means operate to control the open and closed positions of said electronic switching means, an impedance delay line having a predetermined time delay with said first electronic switching means to delay a pulse passing therethrough, a pulse transformer interposed between each pair of said elementary accumulator stages and connected with said second electronic switching means and said delay line, and a clear line in circuit relationship to said trigger circuit adapted to actuate said trigger circuit to a predetermined position.

4. A binary accumulator circuit of the parallel type, comprising a plurality of elementary accumulator stages including a trigger circuit having two stable operating conditions, an addend input for said trigger circuit, a first electronic switching means connected to and biased to an open and a closed position by said trigger circuit and said addend input wherein a pulse fed to said addend input is operable to actuate said trigger circuit to one stable position and also, depending on the initial condition of the trigger circuit, pass through said first electronic switching means as a carry pulse, an impedance delay line having a predetermined time delay operatively connected to said first electronic switching means and adapted to delay said carry pulse a predetermined interval, a second carry input for said trigger circuit, a second electronic switching means connected with and biased to an open and a closed position by said trigger circuit and said carry input wherein a carry pulse from a proceeding elementary accumulator stage is operable to actuate said trigger circuit to its other stable position and depending on the initial condition of said trigger circuit pass through said second electronic switching means, and a pulse inverting transformer connected to said delay line and said second electronic switching means adapted to invert a carry pulse prior to its entrance into the next succeeding elementary accumulator stage.

5. A binary accumulator circuit comprising a plurality of elementary accumulator stages arranged for serial operation and each including a trigger circuit having two stable conditions, a first pulse input means connected with said trigger circuit, a first switching means between said trigger circuit and said first pulse input means, a delay line having a predetermined time delay connected to the first switching means, a second pulse input connected with said trigger circuit, a second switching means between said trigger circuit and the second pulse input means, a pulse transformer connected to said delay line and second switching means for conditioning a carry pulse from one accumulator stage and prior to its entrance to the next accumulator stage.

References Cited in the file of this patent

UNITED STATES PATENTS

2,516,356 Tull et al. ............ July 25, 1950